April 27, 1943.   J. K. SCHAEFER   2,317,944
CUTTING TOOL FOR B-X ARMORED CABLE AND TUBING
Filed Oct. 11, 1940    4 Sheets-Sheet 3
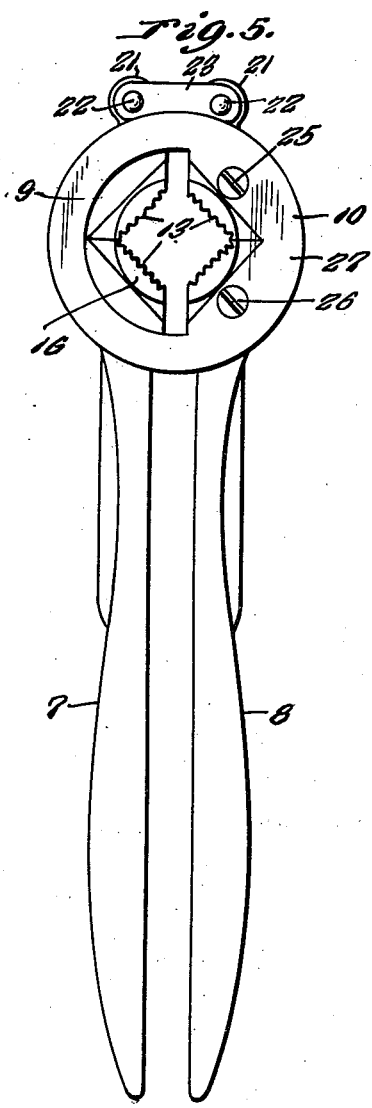
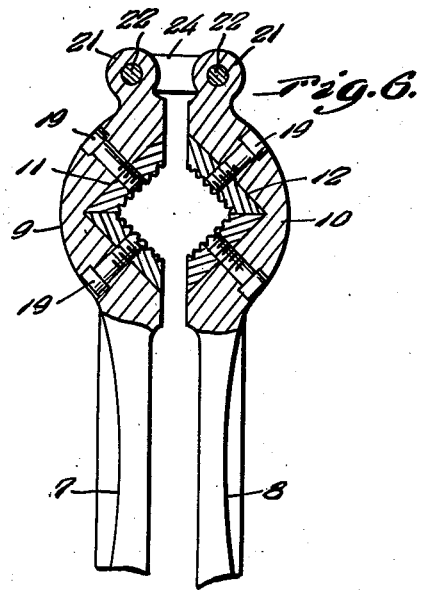
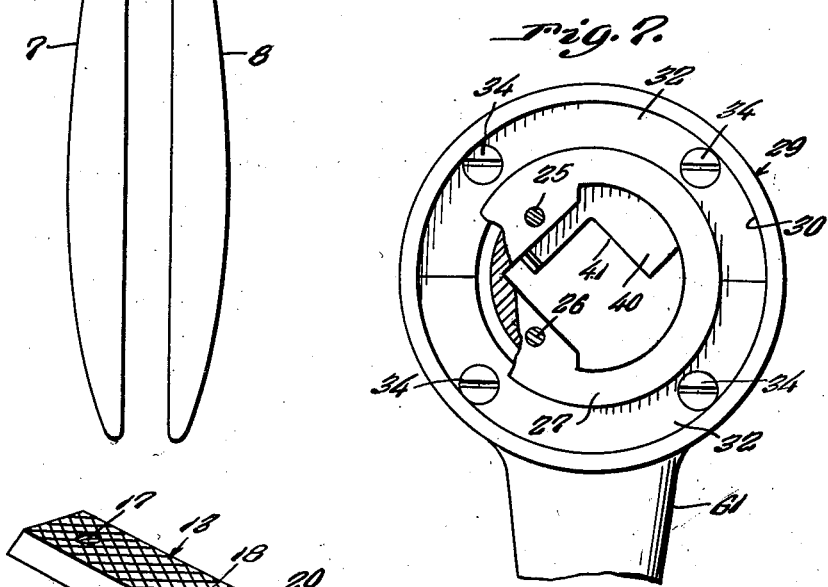
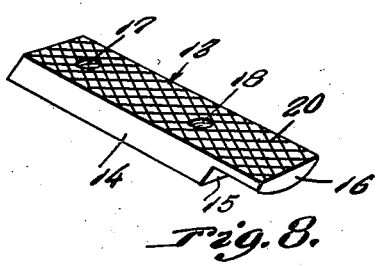
Inventor
Joseph K. Schaefer
By Clarence A. O'Brien
Attorney April 27, 1943.  J. K. SCHAEFER  2,317,944
CUTTING TOOL FOR B-X ARMORED CABLE AND TUBING
Filed Oct. 11, 1940  4 Sheets-Sheet 4
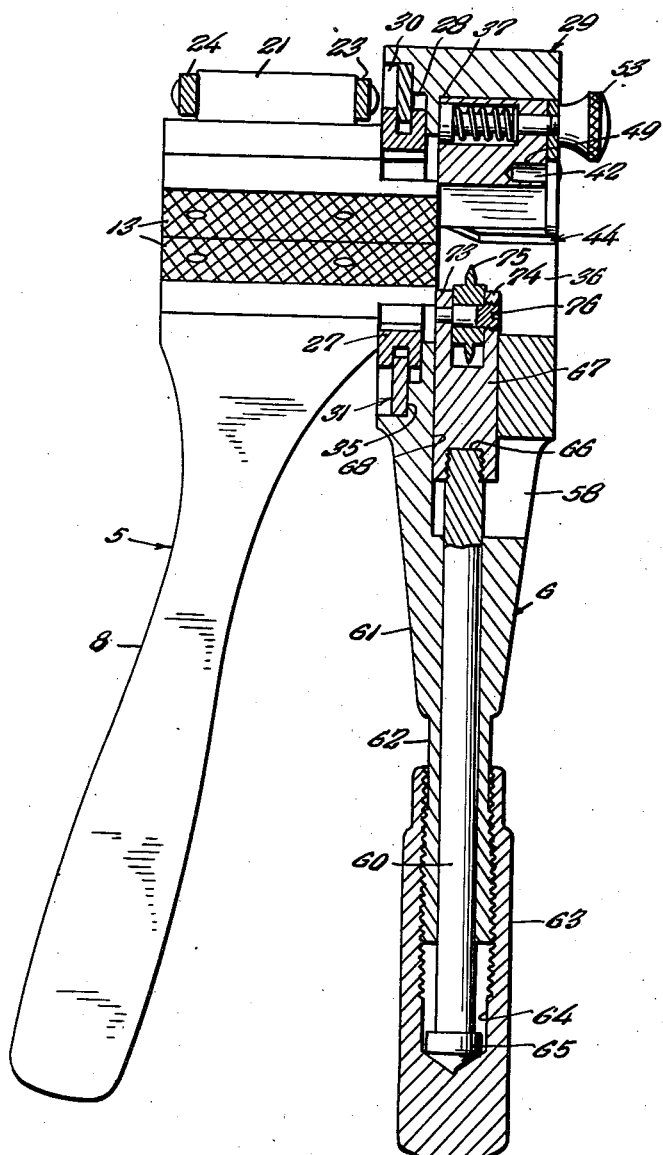
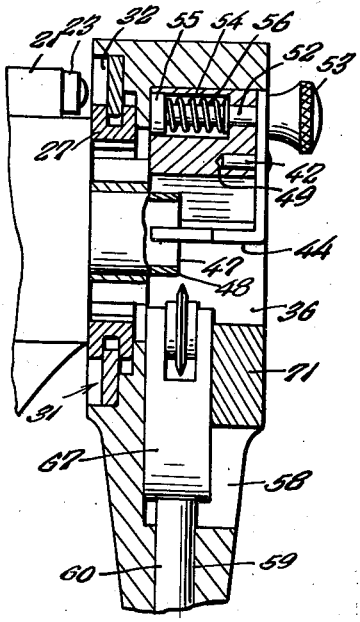
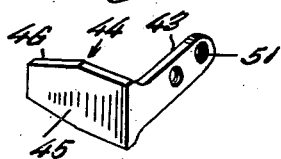
Inventor
Joseph K. Schaefer
By Clarence A. O'Brien
Attorney Patented Apr. 27, 1943

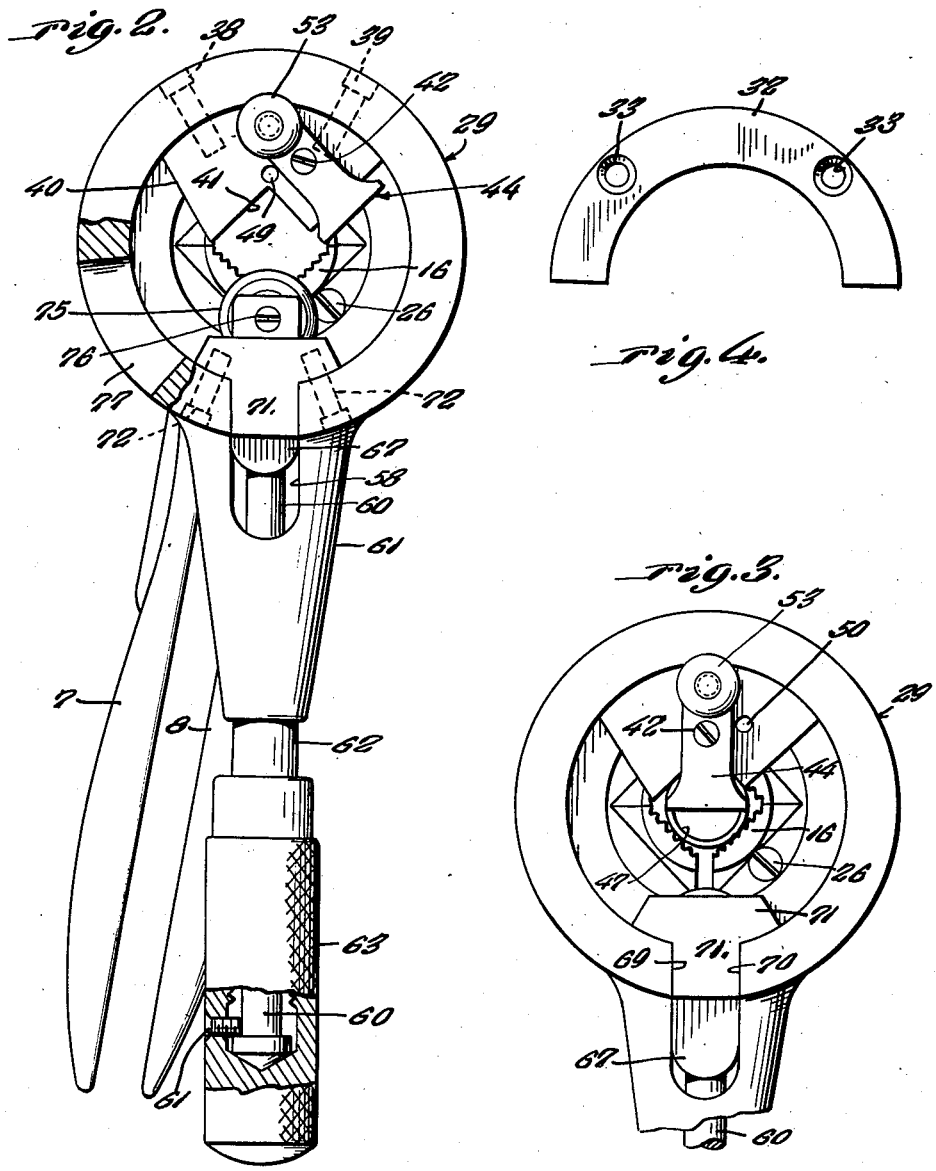

2,317,944

UNITED STATES PATENT OFFICE 2,317,944

CUTTING TOOL FOR BX ARMORED CABLE AND TUBING

Joseph K. Schaefer, Hollywood, Calif.

Application October 11, 1940, Serial No. 360,849

8 Claims. (Cl. 30—96)

My invention relates to improvements in tools for cutting tubing, and particularly adapted to cutting BX electrical conduit and the like, and the primary object of my invention is to provide a simple and efficient tool of this character which requires no other support either for the work or for the tool than the two hands of the operator.

Other objects of the invention are:

First, to provide a novel cutting tool which has attached thereto a novel simple fast acting hand clamp, which is held in one hand and has a vice like grip on the BX armored cable or tubing, and which leaves the other hand free to operate the cutting tool.

Second, to provide a novel tube cutting tool which has attached to the head of the cutting tool, a simple reaming device which can be swung in and out of the reaming position, for reaming the tubing while being held in the hand clamp, thus eliminating the necessity of additional tools, by completing both cutting and reaming of tubing in an accurate and fast manner.

Third, to provide a novel cutting tool, which contains an automatic adjusting means between the hand clamp and the cutting tool, for self centering of cutting tool relative to various sizes of cable or tubing held in the stationary hand clamp to be cut.

Fourth, to provide a novel cutting tool which is simple in design and principle, and which will consequently be economically manufactured.

Further important objects and advantages of my invention will be apparent from a reading of the following description taken in connection with the drawings, wherein for purposes of illustration I have shown a preferred embodiment of my invention.

In the drawings:

Figure 2 is a right hand side elevational view of the tool showing the reamer in an inoperative position.

Figure 3 is a fragmentary view similar to Figure 2 but showing the reamer in reaming position with respect to the cut end of a tube.

Figure 4 is a face view of one of the retaining ring sections.

Figure 5 is a left hand end elevational view of the tool showing the handles in substantially closed position.

Figure 6 is a fragmentary longitudinal sectional view taken through the jaws.

Figure 7 is a fragmentary enlarged right hand end elevational view of the tool with the jaw sections removed.

Figure 8 is a perspective view of one of the knurled jaw sections.

Figure 9 is a general longitudinal vertical sectional view taken through the tool.

Figure 10 is a fragmentary general longitudinal vertical sectional view taken through the tool on a plane slightly to the rear of the plane on which Figure 9 is taken and showing the reamer in reaming relation to tubing gripped in the jaws.

Figure 11 is a perspective view of the reamer.

Figure 1:
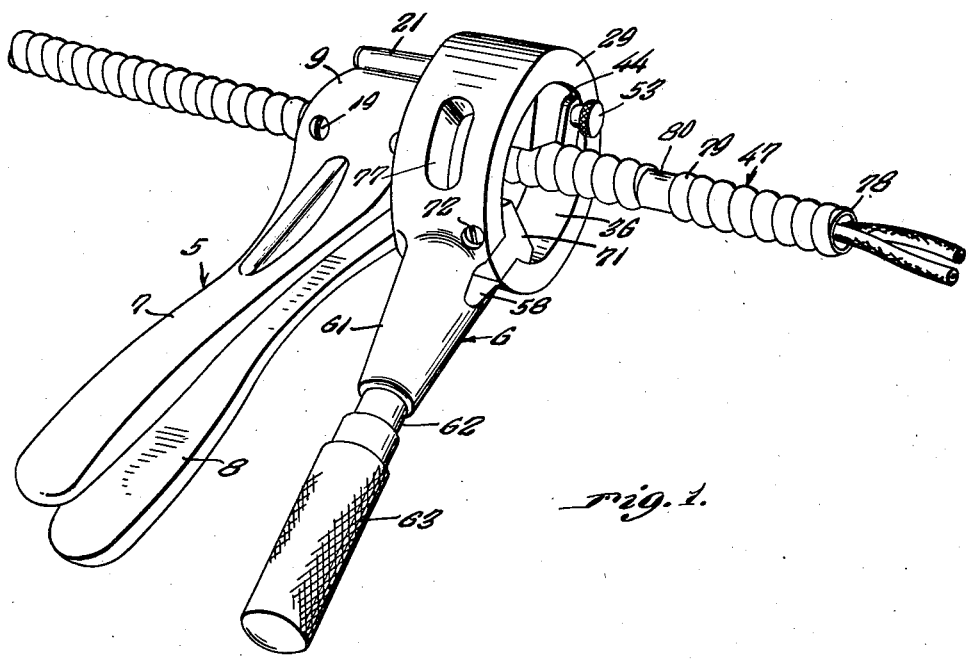
Figure 1 is a general perspective view showing my tool in cutting relation to a length of BX conduit and showing a portion of the exterior skin of said conduit removed by means of the tool and being slightly pulled apart to show the inner insulation lining intact, and an end representing a complete cut through the exterior skin and the inner insulation to expose the wires in the cable.

Referring in detail to the drawings the numeral 5 generally designates the tubing holding section and the numeral 6 the tubing cutting section of the present tool which are mutually supporting and connected together but are rotatable relative to each other and shiftable at any point in their relative rotation in a plane extending across their axes, without having any relative longitudinal movement.

The tubing holding section 5 consists of a pair of relatively flat elongated handles 7 and 8 which terminate in substantially semi-cylindrical terminals 9 and 10, respectively, which have right angular notches 11 and 12 in their inner faces to accept the knurled jaw sections 13. These jaw sections are similar in shape and arrangement and comprise relatively flat bars with their longitudinal edges beveled as indicated by the numeral 14, with one end of each bar undercut as indicated by the numeral 15 to define a segmental cross section lug 16. Each jaw section has a pair of threaded holes 17, 18, respectively, to receive corresponding studs 19 threaded radially through holes extending through the handle terminals 9 and 10 as clearly shown in Figure 6. The companion beveled edges 14 meet and engage so that the jaw sections are assembled with their knurled faces 20 located at right angles with respect to each other. Cylindrical transverse extensions 21 on the upper ends of the terminals 9 and 10 carry pins 22 which extend beyond the opposite ends of the said extensions where they are connected with the corresponding ends of inner and outer links 23 and 24, respectively, whereby the handles are pivotally connected in an articulated manner. It is obvious from the foregoing that the jaw sections are subject to easy removal and replacement to make available different sizes. The segmental lugs 16 on the jaw sections extend beyond the end of the terminals 9 and 10 and project into the head of the cutter section of the tool in a manner to be described herein. Spacedly surrounding the said lugs and attached to the terminal 10 by means of screws 25 and 26 is the circumferentially grooved annulus 27 shown in Figure 5 of the drawings.

The annulus 27 is received in a circular opening 28 in the adjacent face of the cutter head 29 of the cutter section 6 as clearly shown in Figures 9 and 10, the diameter of the opening 30 being substantially larger than the exterior diameter of the annulus 27, the width or length of the opening 28 being substantially the same as the width of the annulus so that the outer side of the annulus is relatively flush with the face of the cutter head. The opening 28 has a larger diameter concentric enlargement 30 opening through the same side of the cutter head to receive the sectional retaining ring 31 which is composed of similar upper and lower semi-circular sections 32 each of which has a pair of counterbored screw receiving holes 33 receiving screws 34 which fasten the ring sections to the shoulder 35 in the opening 30, with the radially inward edges of the resultant ring 31 received in the groove of the annulus 27. The opening in the ring 31 is larger in diameter than the diameter of the bottom of the groove in the annulus 27, so that the annulus 27 is free not only to rotate relative to the ring 31, but to move in a plane across the axis of the cutter head 29.

The cutter head 29 is substantially cylindrical in form, having a bore 36 which extends inwardly as far as the point 37 in longitudinally spaced relation to the opening 28. Screws 38 and 39, respectively, located at circumferentially spaced points pass through the top of the cutter head as illustrated in Figure 2 and thread into a segmental block 40 which has a right angular opening 41 in its lower end which is substantially complementary to the aperture and location of the upper jaw sections of the holding section of the tool when the holding section is in substantially closed position, as indicated in Figure 2 of the drawings. Pivoted at 42 in the center of the end of the block 40 is the standard portion 43 of the reamer which is generally designated 44 and which has a foot portion 45 with a tapered end 46 to enter the end 48 of tubing 47 clamped in the jaw sections and extending into the bore 36 as illustrated in Figure 10 of the drawings. In Figure 2 the reamer is shown swung to an inoperative position while in Figure 3 the reamer 44 is shown in its operative position with its pin 42 engaging in the hole 49 in the end of the block instead of in the hole 50 in the end of the block. The upper part of the standard portion 43 of the reamer has a hole 51 through which works a plunger rod 52 having a handle 53, the said rod working in an opening 54 in the said block and having a head 55 between which and the forward end of the opening 54 there is compressed an expanding spring 56 which draws the rod 52 inwardly, while yieldably permitting the knob 53 to be drawn out sufficiently far to release the pin 42 from the corresponding hole for entrance in the other hole in the opposite position of the reamer. It is believed obvious that with the tapered terminal 46 of the reamer inserted in the end of the tube 47 the cutter section 6 will produce the internal reaming at the end of the tube.

Opening into the bore 36 at a point diametrically opposite to the block 40 is the opening 58 which extends through the right hand end of the cutter head, and the radially outward extremity of this opening communicates with the radially inward end of a bore 59 in which the cutter shaft 60 is slidably confined, a portion of the opening 58 and all of the bore 59 being in a radial extension 61 on the cylindrical cutter head. The said extension has a tapered and exteriorly threaded reduced part 62 on which is externally threaded a hollow rotatable handle 63 which has a bore portion 64 rotatably receiving the flanged head 65 on the lower end of the shaft 60. With this construction it is obvious that rotation of the hollow handle 63 in one direction will produce movement of the shaft 60 in one radial direction, while rotation of this handle in the opposite direction will permit the shaft 60 to be moved in the opposite direction. The radially inward end of the shaft 60 is threaded into a socket 66 in a cutter supporting block 67 which bears slidably against the inner wall 68 of the opening 36 and against a portion of the flange in the cutter head which divides the bore 36 from the opening 28, the sides of the block 67 bearing against the sides 69 and 70, respectively, of the opening 36. The laterally outward side of the block 67 bears slidably against a T-shaped block 71 whose standard portion 71 engages the sides 69 and 70 of the opening 58, with the undersides of the cross arms bearing against the peripheral wall of the bore 36 as clearly shown in Figures 2 and 3 of the drawings, radially arranged screws 72 passing through openings in the cutter head to thread into the cross arms of the block 71 to hold the same removably in position.

The cutter block 67 has ears 73 and 74 rising from its top and between these is rotatably mounted a cylindrical cutter having a beveled radially extending annular edge 75, the cutter being held rotatably in place by a removable pin 76 which has a portion entering an opening in the ear 73 and a portion threaded into the ear 74 as clearly shown in Figure 9, whereby the cutter is readily removable for replacement. An opening 77 through the front side of the cutter head and extending into the bore 36 is provided to discharge cuttings from the cutter and to afford a view of the position and action of the cutter relative to the tubing 47.

To cut off tubing or to cut BX cable for stripping to a square smooth end such as indicated by the numeral 78 in Figure 1, the tubing or cable length is passed through the aperture of the jaws and then through the cutter head bore until the place marked on the tubing or cable for the cut is seen through the opening 77 in the cutter head with the edge 75 of the cutter aligned with the bore. The handles 7 and 8 are then compressed together to adequately grip the tubing or cable and the handle of the cutter section is then used to rotate the cutter head about the tubing or cable until the cut has been achieved, the adjusting handle 63 being rotated as required during the cutting operation to give the proper progress to the cutter. In an operation of removing only the external metal covering 79 of such a cable to expose the tubular insulation 80 thereunder, the depth of the cut is predetermined by adjusting manipulation of the handle 63 in an obvious manner.

In a preferable form of the invention radially outward withdrawal of the cutter is positively effected by rotation of the handle 63 in the required direction, through the provision of a pin or screw 61 radially arranged through the side of the handle as shown in Figure 2 to engage the flange on the head 65 on the shaft 60, so that relative longitudinal movement of the handle and the shaft is prevented and withdrawing action of the handle 63 will produce corresponding withdrawing action of the shaft 60. This is distinguished from an arrangement in which the shaft 60 might be radially outwardly withdrawn by hand and without any mechanical provision for its withdrawal by means of rotation of the handle 63.

Although I have shown and described herein a preferred embodiment of my invention, it is to be definitely understood that I do not wish to limit the application of the device to the precise structure and arrangement of parts set forth, except as may be required by the scope of the subjoined claims.

Having described the invention, what is claimed as new is:

1. A cutter for tubing and the like, said cutter comprising a manual tubing holding section including pivoted jaws and a tubing cutting section in side by side relation with the tubing holding section, a cutter in the cutting section, a reduced work-holding extension on the tubing holding section projecting into the cutting section and terminating in close proximity to the cutter to support the work in the region of the cut made therein, and assembling means supportably connecting said holding and cutting sections for rotation and transverse movement relative to each other.

2. A cutter for tubing and the like, said cutter comprising a manual tubing holding section and a tubing cutting section in side by side relation, and assembling means supportably connecting said holding and cutting sections for rotation and transverse movement relative to each other, said holding and cutting sections being formed with substantially axially aligned openings for reception of the tubing to be held and cut, a cutter mounted to project into the opening in the cutting section and terminating adjacent the cutter for cutting engagement with the tubing as the cutting section is rotated relative to the tubing and said holding section, pivoted jaws having an end projecting into the opening in said holding section and terminating adjacent the cutter, and manual means for actuating the jaws into gripping engagement with the tubing to hold the tubing against longitudinal movement and rotation relative to said holding section.

3. A cutter for tubing and the like in accordance with claim 2 wherein said manual means comprises opposed handles extending radially from said holding section.

4. A cutter for tubing and the like in accordance with claim 2 wherein said cutting section comprises a radially projecting handle member.

5. A cutter for tubing and the like, said cutter comprising a manual tubing holding section including pivoted jaws and a tubing cutting section in side by side relation with the tubing holding section, a cutter in the cutting section, a reduced work-holding extension on the tubing holding section projecting into the cutting section and terminating in close proximity to the cutter to support the work in the region of the cut made therein, and assembling means supportably connecting said holding and cutting sections for rotation and transverse movement relative to each other, said assembling means comprising a peripheral groove on a part of said holding section surrounding the opening in the holding section, and annularly arranged portions on said cutting section surrounding the opening in said cutting section and projecting radially inwardly into said groove, the internal diameter of said annularly arranged portions being sufficiently greater than the diameter of said peripheral groove to permit said holding and cutting sections to be moved laterally relative to each other to align the openings in these sections for receiving the tubing while permitting relative rotation and preventing relative longitudinal movement of the sections.

6. A cutter for tubing and the like, said cutter comprising a manual tubing holding section and a tubing cutting section in side by side relation, said cutting section having a cutter therein, and assembling means supportably connecting said holding and cutting sections for rotation and transverse movement relative to each other, said holding section comprising a pair of facing terminals each having a radially projecting handle, the handles being pivoted to each other, jaws on the faces of the terminals, and having work holding extensions projecting into the cutting section and terminating in close proximity to the cutter, said handles being adapted for actuating said terminals toward and away from each other as well as for shifting of said terminals transversely with respect to each other, and said assembling means comprising annular interfitting tongue and groove members connected respectively to the cutter and to one of said facing terminals of the holding section.

7. A tube holding and reaming tool comprising a pair of pivoted tube holding jaws, a member connected to the jaws for rotation relative thereto, said jaws and said member having alined work receiving openings and a reamer pivoted to said member and having a work engaging end projecting axially of the opening of said member.

8. A tube holding and reaming tool comprising a pair of pivoted tube holding jaws, a member connected to the jaws for rotation relative thereto, said jaws and said member having alined work receiving openings, a reamer pivoted to said member and having a work engaging end projecting axially of the opening of said member and means for securing the reamer in its axial work engaging position or in a laterally disposed position.

JOSEPH K. SCHAEFER.